United States Patent
Fuller

(10) Patent No.: US 11,181,629 B2
(45) Date of Patent: Nov. 23, 2021

(54) HAND-HELD RADAR

(71) Applicant: CARRIER CORPORATION, Palm Beach Gardens, FL (US)

(72) Inventor: Christopher Coy Fuller, Bloomington, MN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 276 days.

(21) Appl. No.: 16/465,786

(22) PCT Filed: Nov. 30, 2017

(86) PCT No.: PCT/US2017/063942
§ 371 (c)(1),
(2) Date: May 31, 2019

(87) PCT Pub. No.: WO2018/102544
PCT Pub. Date: Jun. 7, 2018

(65) Prior Publication Data
US 2019/0391248 A1    Dec. 26, 2019

Related U.S. Application Data

(60) Provisional application No. 62/428,936, filed on Dec. 1, 2016.

(51) Int. Cl.
*G01S 13/52* (2006.01)
*G01S 13/00* (2006.01)
(Continued)

(52) U.S. Cl.
CPC ............ *G01S 13/52* (2013.01); *G01S 13/003* (2013.01); *G01S 13/878* (2013.01); *G01S 13/951* (2013.01); *G01S 2013/0245* (2013.01)

(58) Field of Classification Search
None
See application file for complete search history.

(56) References Cited

U.S. PATENT DOCUMENTS 6,359,582 B1    3/2002   Macaleese et al.
6,415,223 B1    7/2002   Lin et al.
(Continued)

OTHER PUBLICATIONS

Hand-held Radar Device Detects Breathing, Heartbeats; Design News; Jan. 19, 1998; 6 pages.
(Continued)

*Primary Examiner* — Bernarr E Gregory
(74) *Attorney, Agent, or Firm* — Cantor Colburn LLP

(57) ABSTRACT

A hand-held device for detecting an object is provided. The hand-held device comprising: a communication device including a plurality of antennas; a processor in communication with the communication device; a memory in communication with the communication device and the processor, the memory comprising computer-executable instructions that, when executed by the processor, cause the processor to perform operations. The operations comprising: receiving at least one radio emission using the plurality of antennas; estimating a reference emission in response to the at least one radio emission; estimating an environment emission in response to the at least one radio emission; determining a pattern of interest in response to at least one of the reference emission and the environment emission; and identifying an object in response to the pattern of interest; wherein the hand-held device is sized to fit in a human hand.

16 Claims, 2 Drawing Sheets

(51) Int. Cl.
*G01S 13/87* (2006.01)
*G01S 13/95* (2006.01)
*G01S 13/02* (2006.01)

(56) References Cited

U.S. PATENT DOCUMENTS

| | | | |
|---|---|---|---|
| 6,417,797 | B1 | 7/2002 | Cousins et al. |
| 6,522,295 | B2 * | 2/2003 | Baugh .................. G01S 13/878 342/453 |
| 7,209,035 | B2 | 4/2007 | Tabankin et al. |
| 7,653,883 | B2 * | 1/2010 | Hotelling ............ G06F 3/04883 715/863 |
| 7,956,794 | B2 | 6/2011 | Skultety-Betz et al. |
| 7,973,704 | B2 | 7/2011 | Storz et al. |
| 8,004,454 | B2 | 8/2011 | Lindoff et al. |
| 8,018,371 | B1 * | 9/2011 | Paschen ................ G01S 13/003 342/90 |
| 8,179,307 | B2 * | 5/2012 | De Gramont ......... G01S 13/003 342/195 |
| 8,237,604 | B2 | 8/2012 | Mohamadi et al. |
| 8,519,885 | B2 | 8/2013 | Ash, Jr. et al. |
| 8,593,329 | B2 | 11/2013 | Mohamadi et al. |
| 9,103,899 | B2 | 8/2015 | Hyde et al. |
| 9,223,018 | B2 | 12/2015 | Dayi et al. |
| 9,696,421 | B2 * | 7/2017 | DiStasio ............... G01S 13/888 |
| 2008/0165048 | A1 * | 7/2008 | Shklarsky ............. G01S 13/003 342/59 |
| 2013/0113647 | A1 | 5/2013 | Sentelle et al. |
| 2013/0204566 | A1 * | 8/2013 | Sgarz ..................... G01S 7/4052 702/94 |
| 2014/0247179 | A1 | 9/2014 | Furuskog et al. |
| 2015/0195398 | A1 | 7/2015 | Schimpff et al. |
| 2015/0355322 | A1 * | 12/2015 | Oshima ................. G01S 13/003 342/116 |
| 2015/0378004 | A1 | 12/2015 | Wilson-Langman et al. |

OTHER PUBLICATIONS

Notification of Transmittal of the International Search Report for International Application No. PCT/US2017/063942; dated Mar. 16, 2018; Reporte Received Date: Mar. 26, 2018; 1-5 pages U300917PCT.

Paul Rooney; QEB Hollis Whiteman; Hand-held speed-detection devices: How and why they should be challenged; http://www.qebholliswhiteman.co.uk/practice-areas/articles-pdfs/hand-held-speed-detection-devices.pdf; May 31, 2019; 2 pages.

Written Opinion of the International Searching Authority for International Application No. PCT/US2017/063942; dated Mar. 16, 2018; Reporte Received Date: Mar. 26, 2018; 1-6 pages.

* cited by examiner

HAND-HELD RADAR

BACKGROUND

The embodiments herein generally relate to radar systems and more specifically, a device and method for detecting objects using radio emissions.

Radio detection and ranging (RADAR) systems utilize radio waves to detect objects and characteristics associated with the objects, such as, for example the range, angle, size, and velocity of the object. Typically, RADAR systems are large in size and difficult to transport. Accordingly, there exists a need for a device and method for radio detection and ranging that is smaller and easier to transport

BRIEF DESCRIPTION

According to one embodiment, a hand-held device for detecting an object is provided. The hand-held device comprising: a communication device including a plurality of antennas; a processor in communication with the communication device; a memory in communication with the communication device and the processor, the memory comprising computer-executable instructions that, when executed by the processor, cause the processor to perform operations. The operations comprising: receiving at least one radio emission using the plurality of antennas; estimating a reference emission in response to the at least one radio emission; estimating an environment emission in response to the at least one radio emission; determining a pattern of interest in response to at least one of the reference emission and the environment emission; and identifying an object in response to the pattern of interest; wherein the hand-held device is sized to fit in a human hand.

In addition to one or more of the features described above, or as an alternative, further embodiments of the hand-held device may include that the plurality of antennas are arrayed as a phased array.

In addition to one or more of the features described above, or as an alternative, further embodiments of the hand-held device may include that the operations further comprise: confirming the identified object; and tracking the confirmed object.

In addition to one or more of the features described above, or as an alternative, further embodiments of the hand-held device may include that the operations further comprise: determining a threat level of the object; and transmitting an alert signal when the threat level is greater than a selected threat level.

In addition to one or more of the features described above, or as an alternative, further embodiments of the hand-held device may include that the at least one radio emission is at least one of a non-cooperative radio emission and a cooperative radio emission.

In addition to one or more of the features described above, or as an alternative, further embodiments of the hand-held device may include that the communication device includes one or more channels configured to operate in a frequency band less than or equal to about 100 GHz.

In addition to one or more of the features described above, or as an alternative, further embodiments of the hand-held device may include that the pattern of interest comprises at least one of a Doppler shift, amplitude shift, and time shift.

In addition to one or more of the features described above, or as an alternative, further embodiments of the hand-held device may include that the at least one radio emission comprises at least one device signal transmitted by the device.

In addition to one or more of the features described above, or as an alternative, further embodiments of the hand-held device may include that the alert signal comprises at least one of an audio signal, a visual signal, and an electronic signal.

In addition to one or more of the features described above, or as an alternative, further embodiments of the hand-held device may include that the object is a high wind weather event or a person.

According to another embodiment, a method of detecting an object with a hand-held device sized to fit in a human hand is provided. The method comprising: receiving at least one radio emission using a plurality of antennas of a communication device; estimating a reference emission in response to the at least one radio emission; estimating an environment emission in response to the at least one radio emission; determining a pattern of interest in response to at least one of the reference emission and the environment emission; and identifying an object in response to the pattern of interest.

In addition to one or more of the features described above, or as an alternative, further embodiments of the method may include that the plurality of antennas are arrayed as a phased array.

In addition to one or more of the features described above, or as an alternative, further embodiments of the method may include: confirming the identified object; and tracking the confirmed object.

In addition to one or more of the features described above, or as an alternative, further embodiments of the method may include: determining a threat level of the object; and transmitting an alert signal when the threat level is greater than a selected threat level.

In addition to one or more of the features described above, or as an alternative, further embodiments of the method may include that the at least one radio emission is at least one of a non-cooperative radio emission and a cooperative radio emission.

In addition to one or more of the features described above, or as an alternative, further embodiments of the method may include that the communication device includes one or more channels configured to operate in a frequency band less than or equal to about 100 GHz.

In addition to one or more of the features described above, or as an alternative, further embodiments of the method may include that the pattern of interest comprises at least one of a Doppler shift, amplitude shift, and time shift.

In addition to one or more of the features described above, or as an alternative, further embodiments of the method may include that the at least one radio emission comprises at least one device signal transmitted by the device.

In addition to one or more of the features described above, or as an alternative, further embodiments of the method may include that the alert signal comprises at least one of an audio signal, a visual signal, and an electronic signal.

In addition to one or more of the features described above, or as an alternative, further embodiments of the method may include that the object is a high wind weather event or a person.

Technical effects of embodiments of the present disclosure include detecting an object using a hand-held device configured to receive and analyze radio emission using a plurality of antennas arrayed in a phased array.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION OF THE DISCLOSURE

A detailed description of one or more embodiments of the disclosed apparatus and method are presented herein by way of exemplification and not limitation with reference to the Figures.

Figure 1:
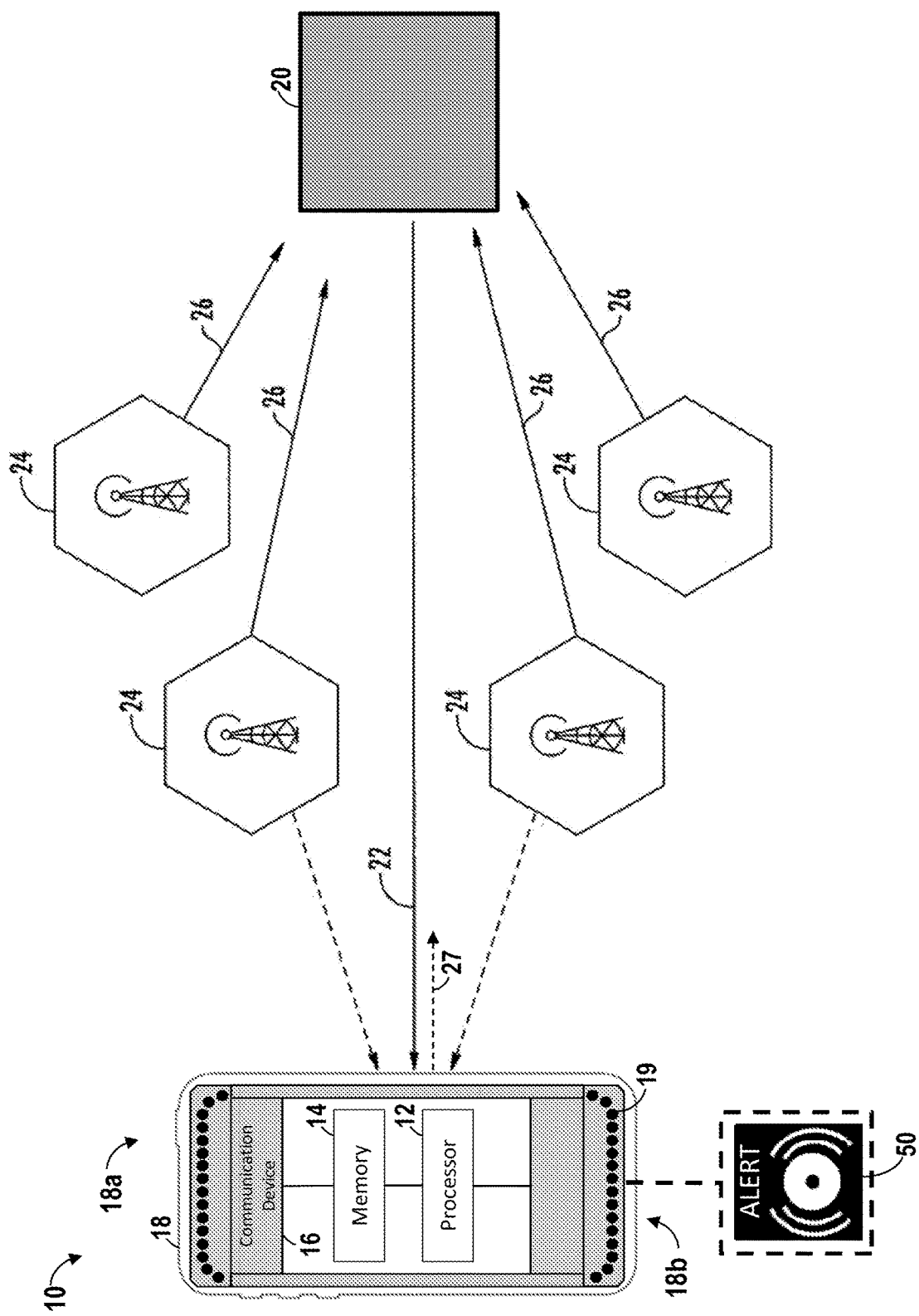
FIG. 1 is a schematic illustration of a hand-held device for detecting an object, according to an embodiment of the present disclosure.

FIG. 1 illustrates a hand-held device 10, according to an embodiment of the disclosure. The hand-held device 10 includes a processor 12, a memory 14, and a communication device 16 in communication with one another. It will be appreciated that the processor 12, memory 14, and communication device 16 may be disposed in a housing 18. One or more programs are stored in memory 14 and are configured to be executed by the processor 12. The programs are configured to determine an object 20, such as, for example a weather event, a high wind weather event, a person, a vehicle, and a building to name a few non-limiting examples. In an embodiment, the object 20 is a high wind weather event. A high wind weather event may include a tornado or a wind storm, to name a couple non-limiting examples.

In an embodiment, the hand-held device 10 is sized to fit in a human hand. In an embodiment, the hand-held device 10 may include or be integrated into other devices such as a cellular phone, a smart watch, a tablet, a laptop, a GPS device, a remote control or any other hand-held device to name a few non-limiting examples. In an embodiment, the hand-held device 10 may be a cellular phone, as shown in FIG. 1. The hand-held device 10 is configured to transmit an alert signal 50, described further below.

The communication device 16 includes one or more channels to receive at least one radio emission 22. In an embodiment, the one or more channels operate in a frequency band less than or equal to about 100 GHz. It will be appreciated that the one or more channels may operate at a frequency band greater than 100 GHz. For example, the communication device 16 may operate at a frequency between about 70 MHz to 6 GHz.

In another embodiment, the communication device 16 may be configured to transmit a device signal 27. Transmission may occur at frequency bands where noncooperative transmitters 24 may not be found and possibly in bands where non-cooperative transmitters are detected. In such situations, the hand-held device 10 may transmit a cooperative or noncooperative radio signal for the detection of surroundings including a specific object 20. The noncooperative transmitters 24 transmit transmitters emissions 26 (i.e. non-cooperative radio emissions). The range of the transmitted device signal may be limited, but the received emissions may be used for a variety of benefits, including but not limited to, increased knowledge of local clutter for improving the estimates of desired signal, and detection of objects by measuring the characteristics of local clutter.

In an embodiment, the communication device 16 includes a plurality of antennas 19, as shown in FIG. 1. It will be appreciated that by using a plurality of antennas 19 to detect incoming environmental emissions, the direction to the object 20, location, rate of ground motion, size of the object 20, estimated time of arrival, and other features may be determined. Furthermore, by using a plurality of antennas 19 for the transmitter, receiver or both, the relative Doppler shift of each measurement will vary based on the distance and angle of the antennas versus the high wind weather event, enabling high resolution processing based on synthetic aperture and related techniques. As may be appreciated by one skilled in the art, the plurality of antennas 19 may be arrayed in a variety of ways, which may include beam-forming, monopulse configuration, linear arrays, circular arrays, ellipsoidal arrays, phased arrays and other types made from a wide assortment of antenna types including monopole, log-periodic, horn, patch antennas and other types. In an embodiment, the plurality of antennas 19 is arrayed in a phased array, as seen in FIG. 1. The plurality of antennas may be divided into a phased array on a first side 18a of the housing 18 and a second side of the housing 18b, as seen in FIG. 1. In another embodiment, the plurality of antennas 19 may be arrayed in a phased array including sixteen antennas 19 located at the first side 18a of the housing 18 and sixteen antennas 19 located at the second side 18b of a housing 18, as seen in FIG. 1.

Advantageously, utilizing a phased array antenna system allows for the rapid scanning of surroundings with a narrow-beam antenna pattern as directed by processor 12 and associated memory 14.

Figure 2:
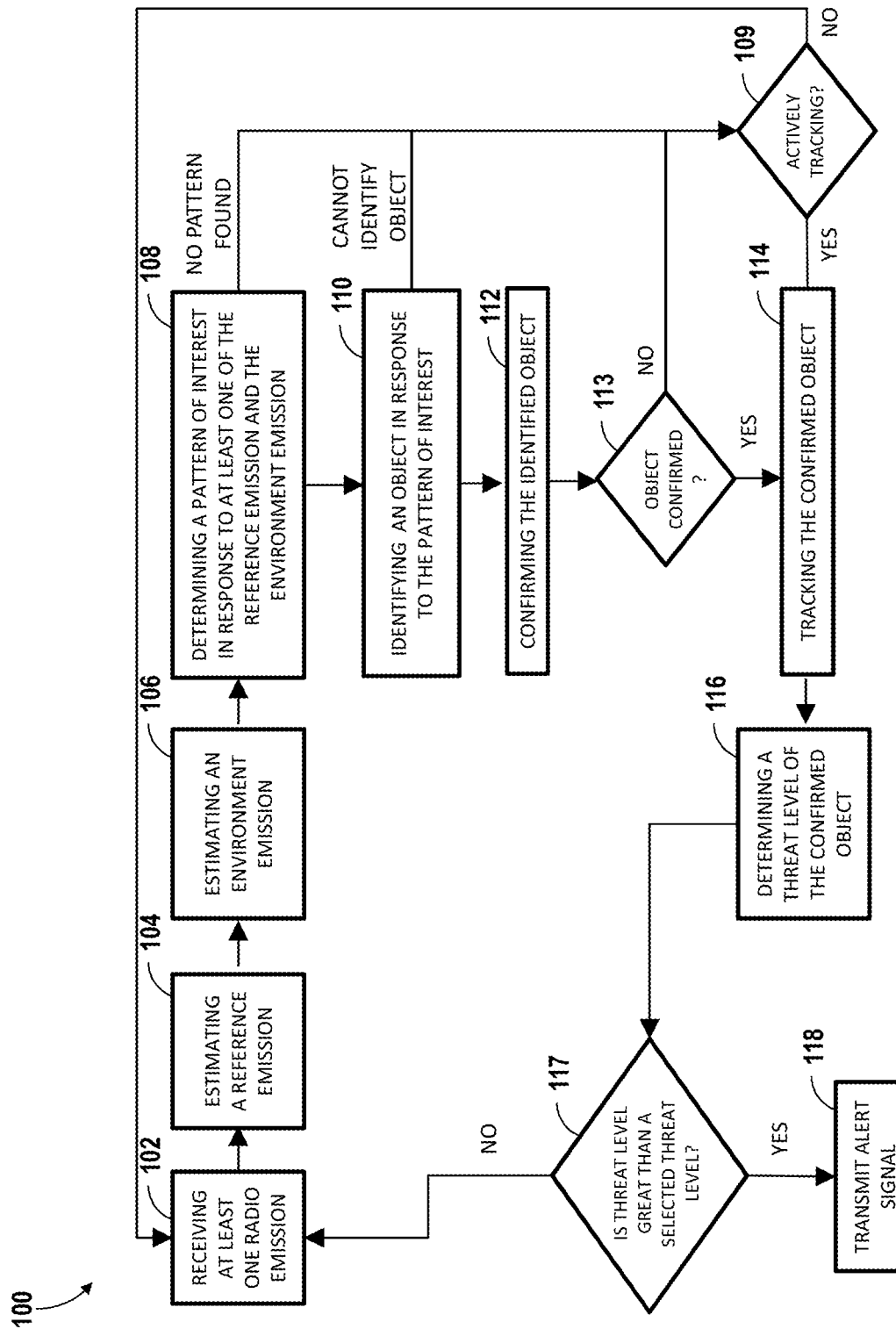
FIG. 2 is a flow diagram illustrating a method for detecting an object using the hand-held device of FIG. 1, according to an embodiment of the present disclosure.

Referring now to FIG. 2 with continued reference to FIG. 1. FIG. 2 illustrates a method 100 of detecting an object 20 utilizing the hand-held device 10, according to an embodiment of the disclosure. At block 102, the communication device 16 receives at least one radio emission 22 over one or more channels of the communication device 16. In an embodiment, the at least one radio emission 22 is at least one of a noncooperative radio emission (i.e., transmitter emission 26) and a cooperative radio emission (i.e., device signal 27).

For example, one or more of the non-cooperative transmitters 24 emits a transmitter emission 26, as seen in FIG. 1. It will be appreciated that the non-cooperative radio transmitters 24 used for the present embodiments include, but are not limited to, a cellular network, AM radio, FM radio, television, and two-way transmitters to name a few non-limiting examples.

If an object 20 is present, the transmitter emission 26 and/or 27 is reflected from the environment (e.g. debris, vegetation, rain, or other objects) which are affected by the object 20. The hand-held device 10 may continuously or intermittently monitor the one or more channels of the communication device 16 by sweeping or hopping frequency channels over multiple frequency bands to receive at least one radio emission 22 reflected by the environment. The frequency sweeping system would sweep across a wide range of frequency which may or may not overlap. Each frequency channel which does not overlap will require use of a new reference signal which reflects from the environment. The bandwidth of each channel in a normal implementation would be the same for each channel, but in some implementations, in order to detect a useful reference signal, it may be necessary to widen the bandwidth of the channel or overlap the channels, requiring channel bandwidths which change over time.

At block 104, the processor estimates a reference emission in response to the at least one radio emission 22. In an embodiment, a reference emission may be demodulated in a way which suppresses the weaker emissions and extracts the stronger emissions within the received at least one radio emission 22 in order to estimate the reference emission as transmitted by the non-cooperative transmitter antenna 24.

It will be appreciated that a reference emission may include any estimate of a signal transmitted by a non-cooperative transmitter as received by the hand-held device 10. This emission may include a direct path signal which has not been reflected or possibly Doppler shifted between a transmitter and a receiver, although sometimes reflections of the reference emission from the environment are unavoidable. The reference emission may be a largest amplitude signal being received in the band being used and all remaining signal content after the reference emission is subtracted or removed from the at least one radio emission 22 would primarily consist of reflections of the reference emission from the environment, although it is usually not possible to eliminate the reference emission perfectly from the radio emissions.

For example, the hand-held device 10 may estimate reference emissions at a GSM cell tower via a prior knowledge of standard Dummy Burst (DB) transmissions for which signals received without Doppler shift are assumed to be part of the reference emission. Similar techniques may be used in other bands where specific transmissions are known to occur and may be identified. The zero Doppler method (e.g. CLEAN), which attenuates all frequency components around zero Doppler signals received, may be combined with or alternated with other methods, for example, a method, which also include consideration of time of arrival and amplitude (e.g. Direct Path Cancellation, DPC) to estimate the reference emission.

In another embodiment, the at least one radio emission 22 is filtered to remove strong nearby clutter, and strong reflections of the reference emission from undesirable targets in order to estimate the reference emissions transmitted by the radio transmitters 24. It will be appreciated that the hand-held device 10 may use multiple methods to demodulate the at least one radio emission 22, including but not limited to, narrowband receivers, wideband receivers, direct down conversion from an antenna (not shown), super-heterodyne, direct comparison to a recreation of the transmitter emissions 26 via a software defined radio, and other methods with fixed or variable integration periods.

At block 106, the processor estimates an environment emission in response to the at least one radio emission 22. It will be appreciated that an environment emission may include radio emission signals in which the estimated reference emission signal has been subtracted in a way to minimize the strongest amplitude of the reference emission leaving, predominantly signal components which represent reflections from the environment of the reference emissions. Complex schemes for generating the environment emission may also reduce the amplitude of the reference emission which has been strongly reflected by clutter in the environment.

Generally, the reference emission is more powerful than the environment emission; thus, it is important that the reference emission and large reflections from the environment are removed from the at least one radio emission 22.

At block 108, the processor 12 determines a pattern of interest in response to at least one of the reference emission and the environment emission. In an embodiment, the pattern of interest includes at least one of a Doppler shift, amplitude shift, and time shift. It is noted that the Doppler shift, amplitude shift, and time shift are often equally important when detecting objects 20; though in some circumstances one parameter may be more important. It will be appreciated that a pattern of interest may be select portions of the environmental emission signal of which a signal or set of signals which may be indicative of an object 20, but which further processing is required to determine with certainty. By ignoring signals within the environmental emissions which are not considered part of a pattern of interest, the system is able to more efficiently process signals and apply more processing power to the signals which are more likely to be part of an object 20. At block 108, if a pattern of interest cannot be obtained, the method 100 returns to block 102 to receive at least one radio emission or block 114 if the tracking sub-system is actively tracking at least one object 20 at block 109.

At block 110, the processor 12 identifies an object in response to the pattern of interest. In one example, the imposed Doppler shift will vary based on the radial speeds of the objects within a debris ball generated by a tornado, but will oftentimes vary from hundreds of meters per second down to very low speeds. By detecting a plurality of Doppler shifts which include relatively high Doppler shifts that both approach (shift positive) and recede (shift negative), a tornado may be detected. The Doppler shift of the emissions will vary from a minimum Doppler shift to a high Doppler shift. At block 110, if an object 20 cannot be identified, the method 100 returns to block 102 to receive at least one radio emission or to block 114 if the tracking system is actively tracking at least one object at block 109.

Detection of a Doppler shift in one direction (increasing or decreasing) or increasing and decreasing Doppler shifts with both the shifts located near the antenna may be used to determine the motion of an object. The intensity of the environment emissions reflected from the object 20 may also be used to indicate relative distance to the object 20, size of the object 20, and/or speed of the object 20. Furthermore, the difference in time of arrival between the reference emission and object emission 22 may be used to determine distance, direction and speed.

Advantageously, the hand-held device 10 may be able to distinguish between objects using Doppler shifts. For example, the hand-held device 10 is able to distinguish between a tornado and other airborne objects such as an airplane or helicopter propeller to name a couple of non-limiting examples, because propellers cause a narrow, fixed Doppler shifts (approaching and receding) in the reflected signal whereas the debris ball from a tornado causes a wide range of Doppler shifts. Additionally, aircraft occupy a relatively small region of space compared to the debris ball from a destructive tornado. Moreover, aircraft often do not operate during severe storms, emit electromagnetic fields characteristic of tornadoes and lightning, and generally do not often cause widespread violent movement of ground vegetation. Geolocation techniques may be used to exclude areas where a plurality of propellers might cause false identification of an object, specifically a high wind weather event, near an airport or wind farm to name a couple of non-limiting examples. Other methods include, but are not limited to, pattern recognition, comparison to Bayesian statistical models, comparisons to vector models, etc.

At block 112, the processor 12 confirms the identified object 20 by further additional processing of data corresponding to the identified object. The object 20 may be confirmed via receiving information from a secondary source. In another embodiment to confirm the identified object 20, the hand-held device 10 may monitor one or more channels including frequencies which have been determined to manifest characteristic emissions within the 0.1 MHz to 100 MHz frequency bands, and determine whether an electromagnetic emission characteristic of the object 20 has occurred and to characterize the object 20. By maintaining a rolling average of power versus frequency within this frequency band, or average power in the entire frequency band, a change in measured power from the average power could be used as a secondary confirmation of an object 20.

In an example where the object 20 is a high wind weather event such as a tornado, verification of conditions in which such an event may occur may be performed via any of the following: independent measurement of temperature, humidity and atmospheric pressure, automatic communication with a secondary source such as a weather bureau or commercial service via a separate device such as a cell phone, internet, Plain Old Telephone System (POTS), radio network, or via another passive radar system connected via a mesh network to name a few nonlimiting examples, and communicated to the hand-held device 10. It will also be appreciated that the hand-held device 10 may include one or more sensors capable of measuring temperature, humidity and/or atmospheric pressure or devices for communicating with secondary sources of information in order to confirm the identified object.

In another example, measuring a time-frequency characteristics of lightning strike electromagnetic emissions may be used to confirm that the identified object is a high wind weather event, such as a tornado. The hand-held device 10 may monitor the frequency content of relevant bands over time combined with the described passive radar techniques to identify and determine the location of the lightning. Moreover, secondary confirmation may come from another device or system in communication with the hand-held device 10.

Once the object 20 is confirmed at block 113 then at block 114, the method 100 may further include that the processor 12 tracks the confirmed object 20. Once the object 20 is confirmed, the processor 12 will determine whether the newly identified object 20 matches any previously detected objects via comparison of the measured characteristics, possibly including predicting previously detected characteristics to the time of the present detections. If not, the hand-held device 10 will establish a new entry in a tracking sub-system. As new detections occur, the hand-held device 10 will attempt to associate the newly identified object 20 with previously detected objects stored in the tracking sub-system. If the tracking sub-system is full, tracking may be implemented to give priority to the tracks which appear to be the greatest threat and delete or combine detections which appear to be a lower priority. The tracking sub-system may also work in coordination with other systems to improve the detections and tracking. For example, other nearby systems may share detections and tracks in order to increase the number of entries in the tracking table, improving the statistics of predictions of the future state of a track. In another example, combining detections from multiple systems improves the range resolution, Doppler shift, ground speed, angle accuracy and other parameters by providing multiple 'views' of the target from multiple perspectives and increasing the effective bandwidth of the detections.

It will be appreciated that the hand-held device 10 may use such tracking methods such as use of covariance matrices, Kalman filters, extended Kalman filters, Gaussian Mixture Probability Hypothesis Density Filer, multi-stage tracking (e.g. bistatic range/Doppler and Cartesian trackers), Probabilistic Multi-Hypothesis tracker, spherical interpolation, spherical intersection, extended cross-ambiguity functions, change detection schemes, multiple stage tracking for use when integration periods for Doppler and range differ and other techniques in combination or individually as part of the tracking scheme for identified objects 20.

At block 116, the method 100 may further include that the processor 12 determines a threat level of the object 20. For example, based on the tracking information stored about the each object, the hand-held device 10 may determine a threat level of each track. A threshold alarm state may be set individually for one or more state parameters (e.g. EM emissions, location, estimated time of impact, direction, etc.) being tracked or a subset of state parameters being tracked.

In one embodiment, the threat level is based at least in part on an object threat level and a system-wide threat level which is based on the object threat level combined with the information available from other sensors and systems. At block 117, if the threat level determined is greater than a selected threat level then the processor transmits an alert signal 50 at block 118. At block 117, if the threat level determined is not greater than a selected threat level then the method 100 moves back to block 102. In an embodiment, the alert signal 50 comprises at least one of an audio signal, a visual signal, and an electronic signal.

For example, the threat levels, alarm states, and/or associated track information may be used to communicate alarm conditions to users, other devices, nearby systems, central monitoring systems, government, or commercial services via the internet, phone lines, cell phone network, audible alarms, visual warnings, and/or other communication methods. In an embodiment, the alert signal 50 occurs on the hand-held device 10. In another embodiment, the alert signal 50 emanates from the hand-held device 10. It will be appreciated that the system may use object threat levels, alarm conditions, and secondary verifications from other systems (e.g. EM emission measurements, active government radar, object states from nearby passive radars, etc.) as part of the decision-making process to determine an overall system-wide threat levels used to determine whether to alert local users and/or other individuals and organizations of alarm conditions, object and system threat levels, associated tracking information, or other information.

Advantageously, a hand-held device 10 using modern multi-core processors may be operating at multiple points within method 100 simultaneously. In a first example, when processing each detection at block 102 requires less time than the remaining steps in the flow chart before returning to step 102. In such a case as this first example, each detection in block 102 may be processed by one or more cores of a multiprocessor as detections become available to maximize use of available signals, maximize target detection probability, reduce delays in responding to threats, and improve accuracy of tracking algorithms among other benefits. Multiple separate processors may also be used to implement various steps of the method 100 for the same purposes.

While the above description has described the flow process of FIG. 2 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hand-held device for detecting an object, the hand-held device comprising:
   a housing including a first side and a second side located opposite the first side;
   a communication device including a plurality of antennas, wherein the plurality of antennas are arrayed in a first phased array on the first side of the housing and a second phased array on the second side of the housing;
   a processor in communication with the communication device; and
   a memory in communication with the communication device and the processor, the memory comprising computer-executable instructions that, when executed by the processor, cause the processor to perform operations, the operations comprising:
   transmitting a cooperative radio emission using the plurality of antennas;
   receiving at least one radio emission using the plurality of antennas, wherein the at least one radio emmission includes the cooperative radio emission and a non-cooperative radio emission that was transmitted from a non-cooperative transmitter;
   estimating a reference emission in response to the at least one radio emission, wherein the reference emission is the non-cooperative signal transmitted by a non-cooperative transmitter to the hand-held device;
   estimating an environment emission in response to the at least one radio emission, wherein the environment emission are reflections of the at least one radio emission from an environment where the object is located;
   determining a pattern of interest in response to at least one of the reference emission and the environment emission; and
   identifying an object in response to the pattern of interest;
   wherein the hand-held device is sized to fit in a human hand.

2. The hand-held device of claim 1, wherein the operations further comprise:
   confirming the identified object via at least one of:
      measuring at least one of temperature, humidity, or atmospheric pressure in order to confirm the identified object; or
      measuring a time-frequency characteristics of lighting strike electromagnetic emissions in order to confirm the identified object; and
   tracking the confirmed object.

3. The hand-held device of claim 1, wherein the operations further comprise:
   determining a threat level of the object, wherein the threat level is a risk posed to a user of the hand-held device by the object; and
   transmitting an alert signal when the threat level is greater than a selected threat level.

4. The hand-held device of claim 3, wherein:
   the alert signal comprises at least one of an audio signal, a visual signal, and an electronic signal.

5. The hand-held device of claim 1, wherein:
   the communication device includes one or more channels configured to operate in a frequency band between 0 and about 100 GHz, wherein the communication device is configured to detect the at least one radio emission over one or more the channels operating in the frequency band between 0 and about 100 GHz.

6. The hand-held device of claim 1, wherein:
   the pattern of interest comprises at least one of a Doppler shift, amplitude shift, and time shift.

7. The hand-held device of claim 1, wherein:
   the at least one radio emission comprises at least the cooperative radio emission.

8. The hand-held device of claim 1, wherein:
   the object is a wind weather event or a person.

9. A method of detecting an object with a hand-held device sized to fit in a human hand, the method comprising:
   transmitting a cooperative radio emission using the plurality of antennas, wherein the plurality of antennas are arrayed in a first phased array on a first side of a housing of the hand-held device and a second phased array on a second side of the housing;
   receiving at least one radio emission using the plurality of antennas of a communication device, wherein the at least one radio emission includes the cooperative radio emission and a non-cooperative radio emission that was transmitted from a non-cooperative transmitter;
   estimating a reference emission in response to the at least one radio emission, wherein the reference emission is the non-cooperative signal transmitted by a non-cooperative transmitter to the hand-held device;
   estimating an environment emission in response to the at least one radio emission, wherein the environment emission are reflections of the at least one radio emission from an environment where the object is located;
   determining a pattern of interest in response to at least one of the reference emission and the environment emission; and
   identifying an object in response to the pattern of interest.

10. The method of claim 9, further comprising:
confirming the identified object via at least one of:
- measuring at least one of temperature, humidity, or atmospheric pressure in order to confirm the identified object; or
- measuring a time-frequency characteristics of lightning strike electromagnetic emissions in order to confirm the identified object; and tracking the confirmed object.

11. The method of claim 9, further comprising:
determining a threat level of the object, wherein the threat level is a risk posed to a user of the hand-held device by the object; and
transmitting an alert signal when the threat level is greater than a selected threat level.

12. The method of claim 11, wherein:
the alert signal comprises at least one of an audio signal, a visual signal, and an electronic signal.

13. The method of claim 9, wherein:
the communication device includes one or more channels configured to operate in a frequency band between 0 and about 100 GHz, wherein the communication device is configured to detect the at least one radio emission over the one or more channels operating in the frequency band between 0 and about 100 GHz.

14. The method of claim 9, wherein:
the pattern of interest comprises at least one of a Doppler shift, amplitude shift, and time shift.

15. The method of claim 9, wherein:
the at least one radio emission comprises at least the cooperative radio emission.

16. The method of claim 9, wherein:
the object is a wind weather event or a person.

* * * * *